Nov. 10, 1964        AKIRA IKEDA            3,156,440
                     AIRCRAFT WING
Filed May 22, 1963                    2 Sheets-Sheet 1
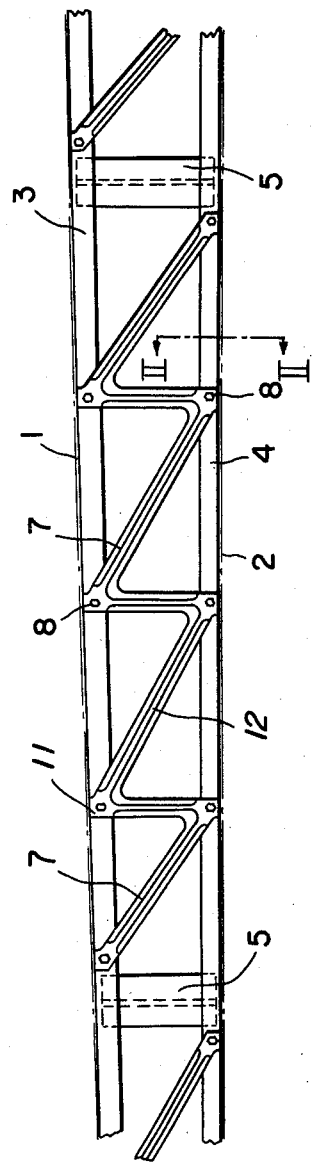
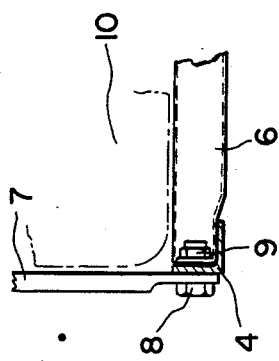

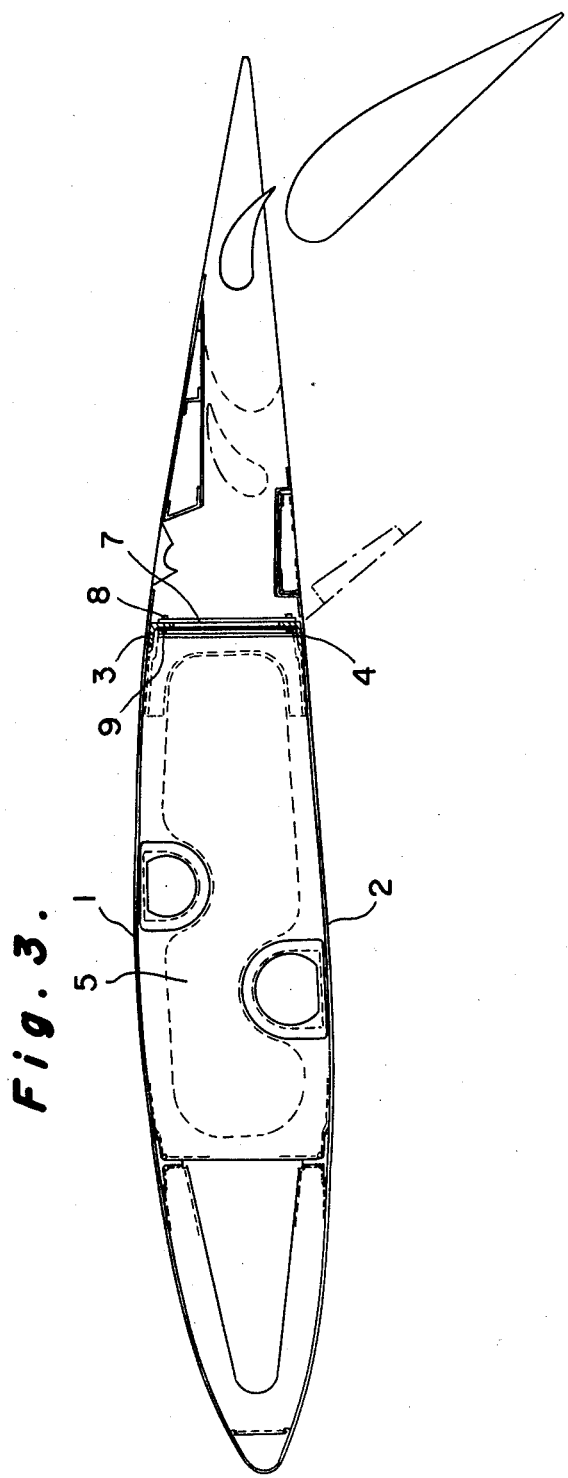

3,156,440
AIRCRAFT WING
Akira Ikeda, Chikusa-ku, Nagoya, Japan, assignor to Shin-Mitsubishi Jukogyo Kabushiki Kaisha, Tokyo, Japan
Filed May 22, 1963, Ser. No. 282,352
Claims priority, application Japan, May 26, 1962, 37/21,798
6 Claims. (Cl. 244—123)

This invention relates to aircraft wings and more particularly to wings adapted to accommodate expansion-type fuel tanks. The invention also relates to associated methods for mounting and demounting such tanks.

Fuel tanks of the expansion type (bladder-type tanks) are widely used in airplanes. In order to mount this type of tank in, or dismount it from, the inside of a wing, an access door is conventionally provided in the outer skin plate of the wing. The provision of an access door in the outer plate of a wing is, however, accompanied by many disadvantages. These include an increase in the number of parts required, a decrease in strength of the wing, an increase of weight of the wing due to the requirement of reinforcement means, and an increase in airflow resistance.

It is an object of the invention to provide an aircraft wing adapted to accommodate an expansible fuel tank without the disadvantages mentioned above.

To this end, the invention contemplates the provision of a wing structure comprising a wing plate having no access door therein, a lattice member being detachably fitted at the trailing edge of the wing to retain in position an expansion-type fuel tank accommodated inside the wing.

A feature of the invention relates to the provision of a wing simply constructed and having said lattice member detachably mounted on flanges of rear beam members provided in the wing so that an expansion-type fuel tank can be inserted or withdrawn through the trailing edge of the wing.

A further object of the invention is to provide an improved method of mounting and demounting a fuel tank in a hollow wing structure.

Other objects and advantages of the invention will become apparent from the following description taken in connection with the accompanying drawing in which:

FIGURE 1 is a fragmentary view of a wing of an airplane provided in accordance with the invention as seen from the trailing edge of the wing;

FIGURE 2 is a fragmentary enlarged sectional view along the line II—II of FIG. 1; and FIGURE 3 is a sectional view of the entire wing.

In the drawings, elements 1 and 2 are respectively upper and lower wing plates or skins having no access door therein and being therefore imperforate. Elements 3 and 4 are flanges of rear beams, flange 3 being the upper face flange of the rear beam whereon the upper wing plate 1 is fitted and flange 4 being the lower face flange of the rear beam whereon the lower wing plate 2 is fitted.

Each element 5 is a partition or rib for dispersing shear forces to the torsion-box structure of the wing. Each element 6 is a reinforcing strut for dispersion of flight forces. The structure 7 is a lattice member detachably connected to the flanges 3 and 4 of the rear beam by means of bolts 8 and nuts 9. Part 10 is the expansion-type fuel tank (bladder-type tank) accommodated inside the wing.

As will be noted in the drawing, there are actually a plurality of lattice members 7, each of which extends between adjacent ribs 5.

Each said lattice member is of sawtooth form the apices 11 of which are coupled to respective of the beam members by the bolts 8 and nuts 9.

It will be moreover noted that the lattice members are provided with a ribbed profile as indicated at 12.

The skin elements 1 and 2 which are coupled to the rear beam members 3 and 4 provide, at least in part, the airfoil configuration of the wing structure. The plurality of ribs spaced longitudinally along the beam members extend therebetween. The reinforcing struts 6 connected to respective of the beam members extend therefrom internally of the skin elements.

For mounting the fuel tank 10 on, or dismounting it from, the inside of the wing, the lattice member 7 is detached from the rear beam flanges 3 and 4 by unscrewing the bolts 8 and nuts 9 which connect the lattice member 7 to the flanges 3 and 4 of the rear beam. When the lattice member 7 is detached, there is freed an opening sufficient to insert or withdraw the fuel tank 10 between the upper flange 3, the lower flange 4 and a flap fitted on the trailing edge part of the wing. The fuel tank itself is of entirely conventional design and applicant disclaims any coverage therefor. Moreover, once the fuel tank has been inserted through the rear beam and placed into position, it is secured in place in conventional fashion and connected to fuel lines in a manner well known in the art.

As mentioned above, the wing of the airplane of the invention comprises wing plates having no access door therein, a lattice member detachably fitted to the rear beam structure of the wing, and an expansion-type fuel tank accommodated inside of the wing. The fuel tank is freely mounted in or dismounted from the inside of the wing through the trailing edge part thereof by detaching the lattice member. As it is not necessary to provide any door or the like for mounting or dismounting the fuel tank, the static strength and fatigue strength of the wing are optimized. Moreover, the air resistance of the wing is minimized. Further, the wing structure is very plain so that weight is minimized and assembly facilitated. Finally, mounting or dismounting of the fuel tank can be performed very easily by merely detaching the lattice member.

It will be obvious to those skilled in the art that the invention is not limited to the specific construction disclosed, but covers all modifications and variations within the definition of the following claims.

What is claimed is:

1. In an aircraft wing structure adapted to accommodate a fuel tank: spaced rear beam members, skin elements connected to said beam members and providing, at least in part, the airfoil configuration of the wing structure, an expansible fuel tank adapted for being positioned between said skin elements, means extending between said beam members at a trailing portion of the wing and means detachably receiving the latter means to said beam members for releasably retaining said tank in said wing structure.

2. In an aircraft wing structure adapted to accommodate an expansible fuel tank: spaced beam members, skin elements mounted on said beam members and providing, at least in part, the airfoil configuration of said wing structure, an expansible fuel tank adapted for being positioned between said skin elements, a lattice structure extending between said beam members, and means to fasten the lattice structure detachably to said beam members for releasably retaining said tank between said skin elements.

3. In an aircraft wing structure: spaced upper and lower rear beam members each including horizontal and vertical interconnected flanges, the vertical flanges of each of said members extending towards each other and defining a space therebetween, upper and lower imperforate skin elements mounted respectively on said beam members, an expansible fuel tank positioned between said skin elements, a lattice structure extending between said beam members, and means to fasten the lattice structure detachably to said beam members for closing the space therebetween for releasably retaining said tank in said wing structure.

4. In an aircraft wing structure: spaced upper and lower rear beam members each including horizontal and vertical interconnected flanges, the vertical flanges of each of said members extending towards each other and defining a space therebetween, upper and lower imperforate skin elements connected respectively to said beam members, an expansible fuel tank positioned between said skin elements, a lattice structure extending between said beam members, and means to fasten the lattice structure detachably to said beam members for closing the space therebetween for releasably retaining said tank in said wing structure, said lattice structure having a sawtooth form the apices of which are connected to the beam members.

5. In an aircraft wing structure: spaced upper and lower rear beam members each including horizontal and vertical interconnected flanges, the vertical flanges of each of said members extending towards each other and defining a space therebetween, upper and lower imperforate skin elements mounted respectively on said beam members and providing, at least in part, the airfoil configuration of the wing structure, a plurality of ribs spaced longitudinally along said beam members and extending between the same, an expansible fuel tank positioned between said skin elements, a lattice structure extending between said beam members and being therefore located at the trailing portion of the wing, and means to fasten the lattice structure detachably to said beam member for closing the space therebetween for releasably retaining said tank in said wing structure, said lattice structure extending between adjacent of said ribs and having a sawtooth form the apices of which are connected to the beam members, said lattice structure having a ribbed profile for the strengthening thereof.

6. In an aircraft wing structure: spaced and substantially parallel upper and lower rear beam members each including horizontal and vertical interconnected flanges, the vertical flanges of each of said members extending towards each other and defining a space therebetween, upper and lower imperforate skin elements mounted respectively on said beam members and providing, at least in part, the airfoil configuration of the wing structure, a plurality of ribs spaced longitudinally along said beam members and extending between the same, reinforcing struts connected to respective of said beam members and extending therefrom internally of said skin elements, an expansible fuel tank positioned between said skin elements, a lattice structure extending between said beam members and being therefore located at the trailing portion of the wing, and means to fasten the lattice structure detachably to said beam members for closing the space therebetween for releasably retaining said tank in said wing structure, said lattice structure extending between adjacent of said ribs and having a sawtooth form the apices of which are connected to the beam members, said lattice structure having a ribbed profile for the strengthening thereof; said wing structure further comprising a flap positioned adjacent said rear beam members and past which the expansible tank is inserted and removed when being mounted and demounted in place between the skin elements.

References Cited by the Examiner

UNITED STATES PATENTS 2,112,154  3/38   Hall _____ 244—123 XR
2,558,807  7/51   Bailey _____ 244—135

FOREIGN PATENTS 626,443   7/49   Great Britain.

FERGUS S. MIDDLETON, *Primary Examiner.*